US011829508B2

(12) United States Patent
Patel et al.

(10) Patent No.: US 11,829,508 B2
(45) Date of Patent: Nov. 28, 2023

(54) USER CONSENT SERVICE UTILIZING MOBILE DEVICE IDENTIFIERS

(71) Applicant: TeleSign Corporation, Marina del Rey, CA (US)

(72) Inventors: Ravishkumar M. Patel, Los Angeles, CA (US); Jelena Vujovic, Belgrade (RS); Dušan Aleksandar Starinac, Belgrade (RS)

(73) Assignee: Telesign Corporation, Marina del Ray, CA (US)

( * ) Notice: Subject to any disclaimer, the term of this patent is extended or adjusted under 35 U.S.C. 154(b) by 169 days.

(21) Appl. No.: 17/181,866

(22) Filed: Feb. 22, 2021

(65) Prior Publication Data
US 2022/0269813 A1 Aug. 25, 2022

(51) Int. Cl.
*G06F 21/62* (2013.01)
*H04W 12/00* (2021.01)
*H04W 8/26* (2009.01)

(52) U.S. Cl.
CPC ...... *G06F 21/6245* (2013.01); *H04W 12/009* (2019.01); *H04W 8/26* (2013.01)

(58) Field of Classification Search
None
See application file for complete search history.

(56) References Cited

U.S. PATENT DOCUMENTS

| 10,733,685 | B1* | 8/2020 | Gailloux | H04W 12/02 |
| 2010/0325691 | A1* | 12/2010 | Willars | H04L 67/564 |
| | | | | 709/219 |
| 2017/0098100 | A1* | 4/2017 | Yadgiri | G06F 21/6254 |
| 2019/0028881 | A1* | 1/2019 | Namiranian | H04W 8/183 |
| 2019/0327239 | A1* | 10/2019 | Ferguson | H04L 63/102 |
| 2021/0119808 | A1* | 4/2021 | Johnson | H04W 12/06 |

* cited by examiner

*Primary Examiner* — Meng Li
*Assistant Examiner* — Felicia Farrow
(74) *Attorney, Agent, or Firm* — Perkins Coie LLP

(57) ABSTRACT

A user consent service that collects information on the type of data users have consented to sharing with different service providers (location information, account status, etc.), so that mobile network operators determine whether to approve or deny user information requests. The service receives information from service providers (e.g., websites, cloud services, mobile applications, and other network-accessible resources) which indicates that users have consented to the sharing of certain types of user data with those service providers. In response, the user consent service maintains records cataloging the consent received for the users, including what type of data that the users have consented to sharing with the different service providers (i.e., what pieces of data may or may not be shared with the different server providers). The service generates consent data for mobile network operators, from the records, so the mobile network operators can evaluate requests for user data.

20 Claims, 6 Drawing Sheets

| | Phone Number | Country | Mobile Network Operator | Service Provider 1 | User Data 1 | Consent Method 1 | Status 1 | ... | Service Provider n | User Data n | Consent Method n | Status n |
|---|---|---|---|---|---|---|---|---|---|---|---|---|
| 305a | (555) 123-0123 | US | Horizon | Car Lift | Device location | App | Active | ... | Meal Dash | Device location | SMS | Revoked |
| 305b | (718) 123-4567 | US | Dart | Amazing Goods | Subscriber Status | Web | Active | ... | Car Lift | Device location | App | Active |
| 305c | (978) 121-2121 | US | Dart | BankCorp | Subscriber Status, Contact Info | Web | Active | ... | | | | |
| 305n | +49 (555) 123-0123 | DE | Telefone | Meal Dash | Device location | App | Revoked | ... | | | | ... |

FIG. 3

USER CONSENT SERVICE UTILIZING MOBILE DEVICE IDENTIFIERS

BACKGROUND

Internet users regularly maintain a variety of accounts with websites, cloud applications, or other online service providers. The service providers typically use traditional username and password checks, as a first layer of security, to authenticate user access to the services. To improve account security, the service providers may also layer additional factors of authentication before authenticating a user, some of which may be associated with the user's mobile telephone or mobile network account. For example, the service provider may evaluate the type of the user's mobile telephone, the mobile telephone location, the status of the user's mobile network account (i.e., the account type, whether the account is in good standing, for how long the account has been active, etc.), and other pieces of related data, as additional layers of authentication. By authenticating users through a combination of username and password checks as well as by evaluating additional user data (the combination commonly referred to as two-factor authentication, or "2FA," or multi-factor authentication, or "MFA"), service providers are able to more securely grant account access to only intended users while preventing access by those who have compromised one of the security layers.

Data associated with a user's mobile telephone or mobile network account is typically maintained by the mobile network operator with which the user has the account. Furthermore, it is often the case that the data may only be shared by the mobile network operator with the service provider upon the user agreeing to share the data, due to the sensitivity of the information. However, different mobile network operators have different requirements for establishing that an end-user consented to the sharing of their data, which can make it challenging for service providers to obtain access to the data used to improve account security. It would therefore be desirable to improve the manner in which service providers demonstrate end-user consent to obtaining sensitive user data, thereby increasing the service providers' access to data that is used to improve account security.

BRIEF DESCRIPTION OF THE DRAWINGS

FIG. 3 is a schematic illustration of an exemplary data structure for storing user consent records.

Figure 1:
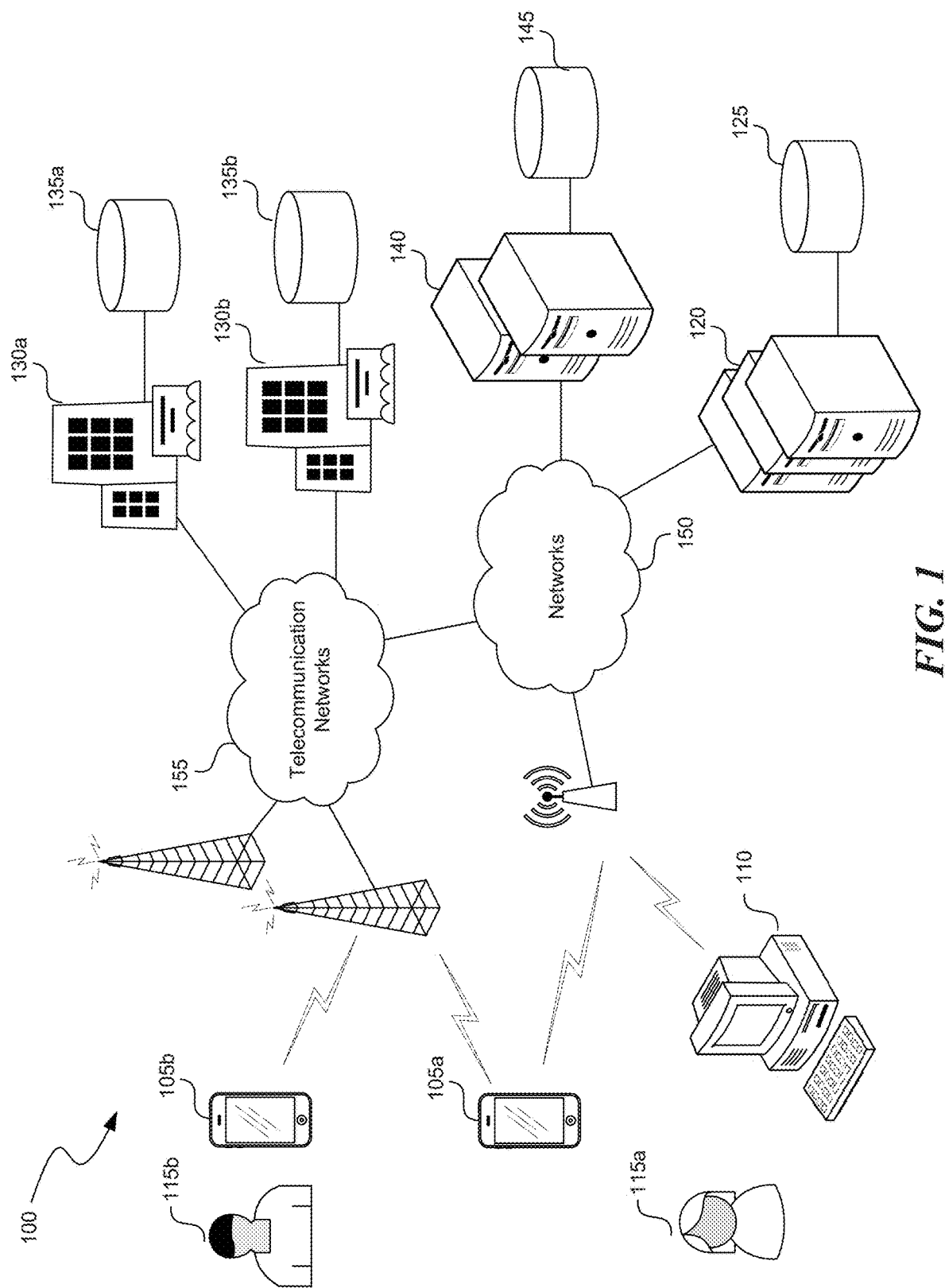
FIG. 1 is a diagram of a representative environment in which a user consent service may operate.

The techniques introduced in this disclosure can be better understood by referring to the following Detailed Description in conjunction with the accompanying drawings.

DETAILED DESCRIPTION

A consent service designed to establish that a user has consented to the sharing of their data with a service provider (the "user consent service"), and associated methods, is disclosed herein. The service receives information from service providers (e.g., websites, cloud services, mobile applications, online applications, and other network-accessible resources) which indicates that users have consented to the sharing of certain types of user data with those service providers. The user data is associated with a user's mobile telephone or mobile network account, identified by a mobile device identifier. For example, the data for which consent has been given can include the type of the user's mobile telephone, the mobile telephone location, and information regarding the user's mobile network account such as subscriber status and user contact information. In response, the service maintains records cataloging the consent received for the users, including what type of data that the users have consented to sharing with the different service providers (i.e., what pieces of data may or may not be shared with the different server providers).

In some embodiments, the user data that the service providers wish to access is obtained from the mobile network operators with which the users have an account. For example, a service provider may need to query the mobile network operator associated with a user to receive the location of the user's mobile telephone. Furthermore, in some embodiments, the mobile network operator may only share the requested data with the service provider upon a showing of user consent. To establish whether users have consented to the sharing of user data, the user consent service provides the mobile network operators with information regarding the consents received for the different users. For example, the service may prepare a consent report that indicates that a user has consented to share some data (e.g., mobile telephone location) with a certain service provider, and other data (e.g., mobile network account status) with a different service provider. In some embodiments, the service only shares the consent records of certain users with certain mobile network operators based on, for example, the country in which the user is located or the mobile network operator with which the user has an account. In some embodiments, the service only shares the consent records that were collected in a manner consistent with the consent-collection requirements of the receiving mobile network operators.

The mobile network operators can, based on whether a user has consented to data sharing as reflected in received consent information such as the consent reports, evaluate how to respond to service provider requests for sensitive user data. Furthermore, as described herein, the service enables users to consent to different degrees of sharing with different service providers. That is, for example, a user may consent to the sharing of their mobile telephone location with a ridesharing service, the status of their mobile network account with an ecommerce site, and both their mobile telephone location and mobile network account status with a financial institution. By employing both fine-grained and persistently maintained consent information, the user consent service enables mobile network operators to more precisely protect the sharing of sensitive user data, which is beneficial to service providers for more securely authenticating user accesses, without burdening users.

Advantageously, the user consent service provides improved security over the manner in which mobile network operators expose user information (e.g., location information and/or account status) to service providers. By exposing to mobile network operators the particular pieces of user information their users have consented to sharing, and how that consent was obtained, mobile network operators are provided with a broader overview of all collected user consents and associated details (e.g., the consent collection method and/or the consent type). This enables the mobile network operators to, for example, deploy more robust security checks using the data from the user consent service. That is, when a service provider requests a particular item of user information from a mobile network operator, the mobile network operator can validate that the associated user consented to the sharing of the requested information with the requesting service provider, and that the consent was obtained in a manner consistent with the mobile network operator's policies.

Though the user consent service is described in the context of sharing data associated with a user's mobile network account, corresponding to a mobile network operator, it will be appreciated that the service can be used with the controllers of other types of data that are typically governed by user consent. For example, the service can be used to facilitate sharing of employment records, health records, financial records, or other sensitive data that would not ordinarily be shared absent user consent.

Various implementations of the service and methods will now be described. The following description provides specific details for a thorough understanding and an enabling description of these implementations. One skilled in the art will understand, however, that the service and methods may be practiced without many of these details or with alternative approaches. Additionally, some well-known structures or functions may not be shown or described in detail so as to avoid unnecessarily obscuring the relevant description of the various implementations. The terminology used in the description presented below is intended to be interpreted in its broadest reasonable manner, even though it is being used in conjunction with a detailed description of certain specific implementations of the and methods.

Suitable Environments

FIG. 1 and the following discussion provide a brief, general description of a suitable environment in which a user consent service may be implemented. Although not required, aspects of the service are described in the general context of computer-executable instructions, such as routines executed by a general-purpose computer, a personal computer, a server, or other computing system. The service can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random-access memory (RAM), read-only memory (ROM), flash memory, or the like, or a combination of such components. Computer-executable instructions may also be stored in one or more storage devices, such as magnetic or optical-based discs, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the service can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the service may be provided electronically over the Internet or over other networks (including wireless networks). Those skilled in the relevant art will recognize that portions of the service may reside on a server computer, while corresponding portions may reside on a client computer.

FIG. 1 illustrates an example environment 100 in which a user consent service operates. The environment may include mobile communication devices 105a and 105b, and personal computing device 110, each of which may be used by users 115a and 115b to access third-party server computers 120. The third-party server computers 120 may host or be associated with one or more network-accessible resources, such as websites, cloud services, online applications, or other online resources offered by a service provider. The users 115a-b may access the third-party server computers 120 to, for example, register a new account with a service provider, access an existing account with a service provider, complete a transaction through a website, etc. The third-party server computers 120 may utilize data storage area 125, which maintains information about users of the service provider, including a username, password, and a telephone number associated with the user (such as a telephone number corresponding to mobile communication devices 105a or 105b). Although FIG. 1 illustrates two users and two mobile communication devices, the computing environment 100 can include any number of users and devices (e.g., millions or billions).

Users 115a and 115b typically have an account with a mobile system operator that provides service to their mobile devices. For example, user 115a may have a mobile network account with a mobile network operator 130a that provides telecommunication services to the user 115a, and user 115b may have a mobile network account with a mobile network operator 130b that provides telecommunication services to the user 115b. Mobile network operators manage their telecommunication networks and user accounts with server computers and other systems (not shown). Data regarding users' mobile network accounts, including account status, the type of mobile communication device 105a-b in use by a user, the location of mobile communication device 105a-b, contact information for the users 115a-b (e.g., name and address), etc., may reside in data storage areas 135a and 135b, utilized by mobile network operators 130a and 130b, respectively.

To improve security, service providers may attempt to use data in addition to a username and password to verify users 115a and 115b in connection with a registration, login, or other access of third-party server computers 120. For example, the service providers may attempt to use the location of mobile communication devices 105a and 105b, or information regarding mobile network accounts associated with the users 115a and 115b, in conjunction with the registration, login, or access processes. To obtain the desired user data to be used to improve account security (e.g., mobile network account status or device location), the service provider may need to request the data from a mobile network operator (via, for example, an API request or other form of query from the third-party server computers 120 to the mobile network operators 130a or 130b systems). For example, service providers may query the mobile network operator with whom a user has a mobile network account, or may query a mobile network operator situated in the same country of the user. However, the mobile network operators may not be permitted to share the requested data with the service providers unless users 115a and 115b have consented to the sharing of the requested data.

The consent service disclosed herein facilitates the sharing of consent information. The user consent service may in part reside on the server computers 140, and assists with establishing that users 115a and 115b have consented to data associated with their mobile network account (maintained by mobile network operators 130a and 130b) being shared with service providers (hosted by third-party server computers 120). The service may maintain user consent records in data storage area 145, utilized by the server computer 140, which catalogs the consents provided by the users 115a and 115b. For example, a service provider may prompt users 115a and 115b to consent to the sharing of certain data, such as part of a registration or login process, and the users may provide their consent via a mobile application running on mobile communication devices 105a and 105b, via a website hosted by third-party server computers 120, or via other means. The service provider may notify the service of any obtained user consents by way of consent updates transmitted by third-party server computers 120 to server computers 140 (e.g., by way of an API call, file upload, or other manner of communication between third-party server computers 120 and server computers 140). The service updates the consent records maintained in data storage area 145, such that the service may track user consents on an ongoing basis. The service provider may also notify the service of any instances in which a user has revoked their consent, again by way of consent updates transmitted by third-party server computers 120 to server computers 140 (e.g., by way of an API call, file upload, or other manner of communication between third-party server computers 120 and server computers 140).

To demonstrate that users have consented to sharing of their data, the user consent service provides mobile network operators with information describing the received user consents. For example, the server computers 140 may generate a consent report based on the consent records maintained in data storage area 145, which may be transmitted to the mobile network operators 130a or 130b. The service may transmit the consent records, for example, on a periodic or as-requested basis. For example, in some embodiments, the server computers 140 generate and transmit an updated consent report upon a request received from a mobile network operator server 130a or 130b (e.g., based on an API request for a consent report or some other form of request). As a further example, in some embodiments, the server computers 140 generate and transmit updated consent reports at a specified time interval (e.g., every 6 hours, every 12 hours, or every 24 hours). In some embodiments, the consent reports transmitted to the mobile network operators represent a subset of the consent records maintained by the service. The subset of transmitted content records may be based on a service relationship. For example, the service could transmit to mobile network operator server 130a a first consent report representing the subset of users with a mobile network account with the corresponding first mobile network operator, and transmit to mobile network operator server 130b a second consent report representing the subset of users with a mobile network account with the corresponding second mobile network operator. The subset of transmitted content records may also be based on a geographic relationship. For example, the service could transmit to mobile network operator server 130a a first consent report representing the subset of users with a telephone number in a country in which the corresponding first mobile network operator offers services, and transmits to mobile network operator server 130b a second consent report representing the subset of users with a telephone number in a country in which the corresponding second mobile network operator offers services. The mobile network operators may store information regarding user consent to share data, such as the consent reports, in data storage areas 135a and 135b.

When a service provider seeks to obtain user data governed by user consent, for example in connection with a registration or login process, the service provider may request the user data from an associated mobile network operator (e.g., the mobile network operator with which the user has a mobile network account, or a mobile network operator operating in a country associated with the user). For example, third-party server computers 120 may send the request for user data to mobile network operators 130a or 130b. The request for user data may include a request for, as an example, mobile network account status or mobile communication device location. The mobile network operator determines whether to provide the requested data based on, for example, whether it has received information indicating that the user has generally consented to sharing user data with the service provider and whether the consent encompasses the type of requested user data. That is, system of the mobile network operator 130a or 130b may evaluate any consent information for the user, which may have been included in consent reports received from the service via server computers 140 and maintained in data storage areas 135a or 135b. For example, the mobile network operators 130a or 130b may evaluate whether the user has consented to data sharing generally, as well as whether the user has consented to data sharing with the specific service provider. As a further example, the mobile network operator 130a or 130b may evaluate whether the user has consented to the sharing (either generally, or to the requesting service provider) of the specific pieces of user data requested by the service provider.

The mobile communication devices 105a and 105b, the personal computing device 110, the third-party server computers 120, mobile network operators 130a and 130b, and server computers 140 communicate with each other through one or more public or private, wired or wireless networks 150 and 155, including, for example, the Internet and telecommunication networks. The mobile communication devices 105a and 105b communicate wirelessly with a base station or access point using a wireless mobile telephone standard, such as the Global Service for Mobile Communications (GSM), Long Term Evolution (LTE), IEEE 802.11, or another wireless standard, and the base station or access point communicates with the third-party server computers 120, mobile network operators 130a and 130b, and server computers 140 via the network 150. Personal computing device 110 communicates through the network 150 using, for example, TCP/IP protocols. The mobile communication devices 105a and 105b additionally communicate wirelessly with the telecommunication network 155 using, for example, nearby cell towers or base stations using wireless mobile telephone standards, such as GSM, CDMA (Code Division Multiple Access), General Packet Radio Service (GPRS), and the like. The network 150 and telecommunication network 155 may be interconnected such that, for example, mobile communication devices 105a and 105b connected to the telecommunication network 155 can communicate via the network 150 with the third-party server computers 120, mobile network operators 130a and 130b, server computers 140, and other devices connected to the network. The mobile communication devices 105a and 105b utilize applications or other software, which operate through the use of computer-executable instructions. Some such applications may be directed toward providing consent to a service provider. As will be described in more detail herein, the user consent service residing at least in part on the server computers 140 may also utilize software which operates through the use of computer-executable instructions as part of a consent process.

Suitable Service

Figure 2:
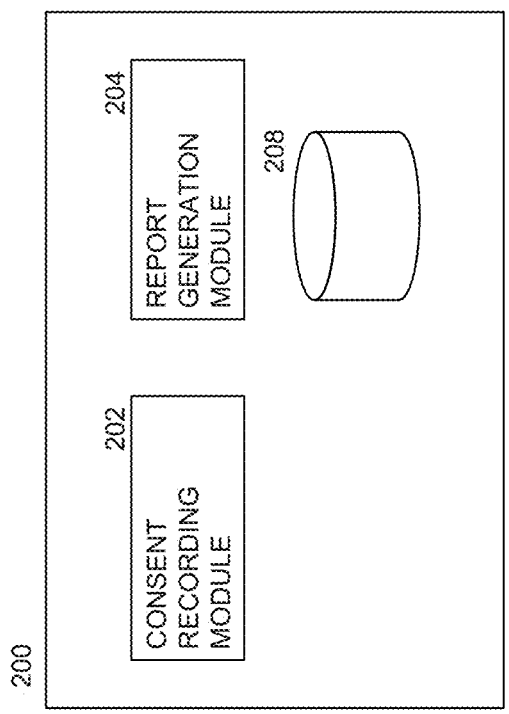
FIG. 2 is a block diagram illustrating a user consent service.

FIG. 2 is a block diagram illustrating modules forming a user consent service 200. Aspects of the service may be practiced on computing devices operated by end-users, computing devices operated by authentication entities, computing devices operated by service providers (e.g., entities or services utilizing or requiring an authentication service), computing devices operated by mobile network operators, or a combination thereof.

A consent recording module 202 generates consent records, which characterize the state of granted and revoked consents from users to share their user data with service providers. In some embodiments the service receives consent updates (i.e., indications of granted, revoked, or modified user consents) from different service providers in response to user interactions with each of the service providers. Using a unique user identifier to identify each user, the service combines the consent updates pertaining to the same user, but from different service providers, into one maintained consent record for the user. For example, each user may be uniquely identified by a telephone number corresponding to a mobile communication device associated with the user. In some embodiments, different elements of user data are governed by user consent (e.g., mobile device location, mobile network account status, and mobile network account age), and the service-generated consent records reflect which specific user data elements the user has consented to sharing. The service-generated consent records also capture the fact that a user has consented to sharing different user data elements with different service providers. The service-generated consent records can also capture information regarding how consent was collected from the user. For example, the user consent records can indicate the manner in which the user provided consent to a service provider (e.g., through an application associated with the service provider, via an SMS message sent to the service provider, or via a website). As a further example, the user consent records can indicate what type or form of consent was given (e.g., an explicit indication from the user that they are consenting to sharing of data with the service provider, or an implicit indication of consent when a user does not decline a request from the service provider).

FIG. 3 illustrates an exemplary data structure 300 for storing user consent records, such as may be generated by the consent recording module 202. As described herein, the consent service may maintain consent records, such as illustrated by the data structure 300, to catalog the type of data sharing that users have consented to. The data structure 300 is made up of consent records 305a, 305b, 305c, and so on, where each consent record 305a-n is associated with a specific user. As illustrated, each consent record 305a-n includes the phone number 310 of a mobile communication device, which may be used to uniquely identify each user. It will be appreciated that the service may use other identifiers to uniquely identify users, including device- or subscriber-specific identifiers (e.g., an MSISDN or international mobile subscriber identity ("IMSI")), user name, or other. In some embodiments, the user identifier (whether a telephone number, MSISDN, IMSI, or other) is stored as a hashed value. The consent records 305a-n additionally include the country 315 associated with the user, which may be determined based on the telephone number associated with the user or based on information from one or more service providers. As described herein, the service may use the country 315 to determine which mobile network operators should receive the consent data for a given user. The consent records 305a-n additionally include the mobile network operator 345 with which the user is subscribed, which may be based on information from one or more service providers or mobile network operators. As described herein, the service may use the mobile network operator 345 to determine which mobile network operator has a service relationship with a given user, and is therefore entitled to the consent data for the user. The consent records 305a-n also include consent data for the different service providers associated with the different users. For example, as illustrated, each consent record 305a-n includes consent data 320a for maintaining information associated with a first service provider, and consent data 320n for maintaining information associated with an n-th service provider. It will be appreciated that a "first service provider" refers to one, of potentially many, service providers to whom a given user has provided consent. Different users may have different first service provider in their corresponding consent record.

The consent data 320a-n each include data characterizing the type and amount of data that users have consented to sharing with the corresponding service provider, including the identity of the service provider 325, the type of user data 330, consent method 335, and status 340. Service provider 325 indicates the particular service provider corresponding to the consent data. For example, as illustrated in FIG. 3, the user corresponding to consent record 305a has given some level of consent (discussed further below) to the service providers "Car Lift" and "Meal Dash." As further illustrated in FIG. 3, the user corresponding to consent record 305b has given some level of consent to the service provider "Amazing Goods."

User data 330 indicates what aspects of the user's data are governed by the consent records for the corresponding service providers. For example, the user corresponding to consent record 305a has at some point consented to sharing their mobile communication device's location with service providers "Car Lift" and "Meal Dash." In contrast, the user corresponding to consent record 305b has at some point consented to sharing their mobile network account subscriber status with "Amazing Goods," and their mobile communication device's location with "Car Lift." In other words, users may be asked to consent to the sharing of different aspects of their user data by different service providers based on the needs of those service providers, and may grant or deny those requests. In addition to the type of data that the user may have consented to share with the service provider (e.g., location data, subscriber status), in some embodiments the user may be able to specify temporal limitations on the shared data. For example, the user might specify that only current (and not past) location data be shared with a service provider, or that only the past 30 days of location data be shared with a service provider. The user data may therefore contain temporal or other constraints on the type of data that is shared.

Consent method 335 indicates the manner in which a user provided consent to a service provider. For example, the consent records 305a-n illustrate examples of users providing service providers with consent via mobile applications, websites, or SMS messages. Status 340 indicates whether the corresponding consent data is active (i.e., the user consent to share the corresponding data with the corresponding service provider remains in effect) or has been revoked (i.e., the consent to share user data is no longer in effect). For example, a service provider may transmit to the service information indicating that a user has consented to the sharing of certain user data, and at a later time transmit to the service information indicating that the user has revoked the sharing consent. In some embodiments, the service maintains a record of the revoked consent, but with a status indicating that the consent to share is no longer in effect. In some embodiments, the service deletes the corresponding data in response to an update that certain user consents have been revoked. When the data for a service provider is deleted from the user consents table, a future request to determine whether a user has consented to share data with that service provider will result in a negative finding.

Although FIG. 3 illustrates the data structure 300 as a human-readable table, in which each consent record associated with a user is represented as a row, and data associated with the user and the consents granted by the user are represented by columns, it will be appreciated that the service may employ other structures or forms.

Returning to FIG. 2, the report generation module 204 generates consent reports for mobile network operators. The report generation module 204 may generate a consent report for a single user (e.g., in response to a request from a mobile network operator identifying the user), a report comprised of all subscribers of a mobile network operator, a report comprised of all users within a country, etc. The report generation module 204 may generate consent reports on a periodic or as-requested basis (e.g., in response to an API call that is received by the service). The consent reports are based on the consent records generated by the consent recording module 202 and illustrated in FIG. 3. In some embodiments, the report generation module 204 generates different consent reports for different mobile network operators or different countries, and includes consent data corresponding to a subset of the consent records based on the intended recipient of the given consent report. For example, a consent report intended for mobile network operators in the United States may include only the consent data corresponding to users in the United States, while a consent report intended for mobile network operators in Germany may include only the consent data corresponding to users in Germany. As a further example, a consent report intended for a particular mobile network operator may include only the consent data corresponding to subscribers to that mobile network operator. In some embodiments, the report generation module 204 includes a subset of the fields illustrated in FIG. 3. For example, the report generation module 204 may omit users' country codes from a consent report intended for a certain country. As a further example, the report generation module 204 may generate a report that includes only active consent data, and omit the status field as well as consent data corresponding to revoked consents. Generated consent reports may vary significantly in size. At the smallest, a consent report may have a single entry with consent information about a particular user as identified by a phone number in a consent report request. At the other extreme, a consent report may encompass millions of users depending on the scope of the request and/or the parameters around the periodic report delivery. As a still further example, the report generation module 204 can generate reports differently based on the different consent collection requirements of the mobile network operators receiving the reports. For example, in countries that require mobile network operators to collect user consent via specific collection methods (e.g., an SMS-based opt-in message from the user providing consent), the generated consent reports for those countries and/or mobile network operators operating in those countries may omit indications of consent obtained from a user via a non-compliant method in the corresponding country (e.g., through a mobile application).

The consent recording module 202 and report generation module 204 can access and store data to storage area 208, such as consent records and consent reports. The data storage area 208 can also store information on rules and regulations describing how user consent information should be collected, such as be mandated by mobile network operators and/or the countries in which those mobile network operators operate. The stored data may be stored in any readily accessible format, including data maintained by a database management system, or in any relational, non-relational, object, or other database.

Flows for a User Consent Service

Figure 4:
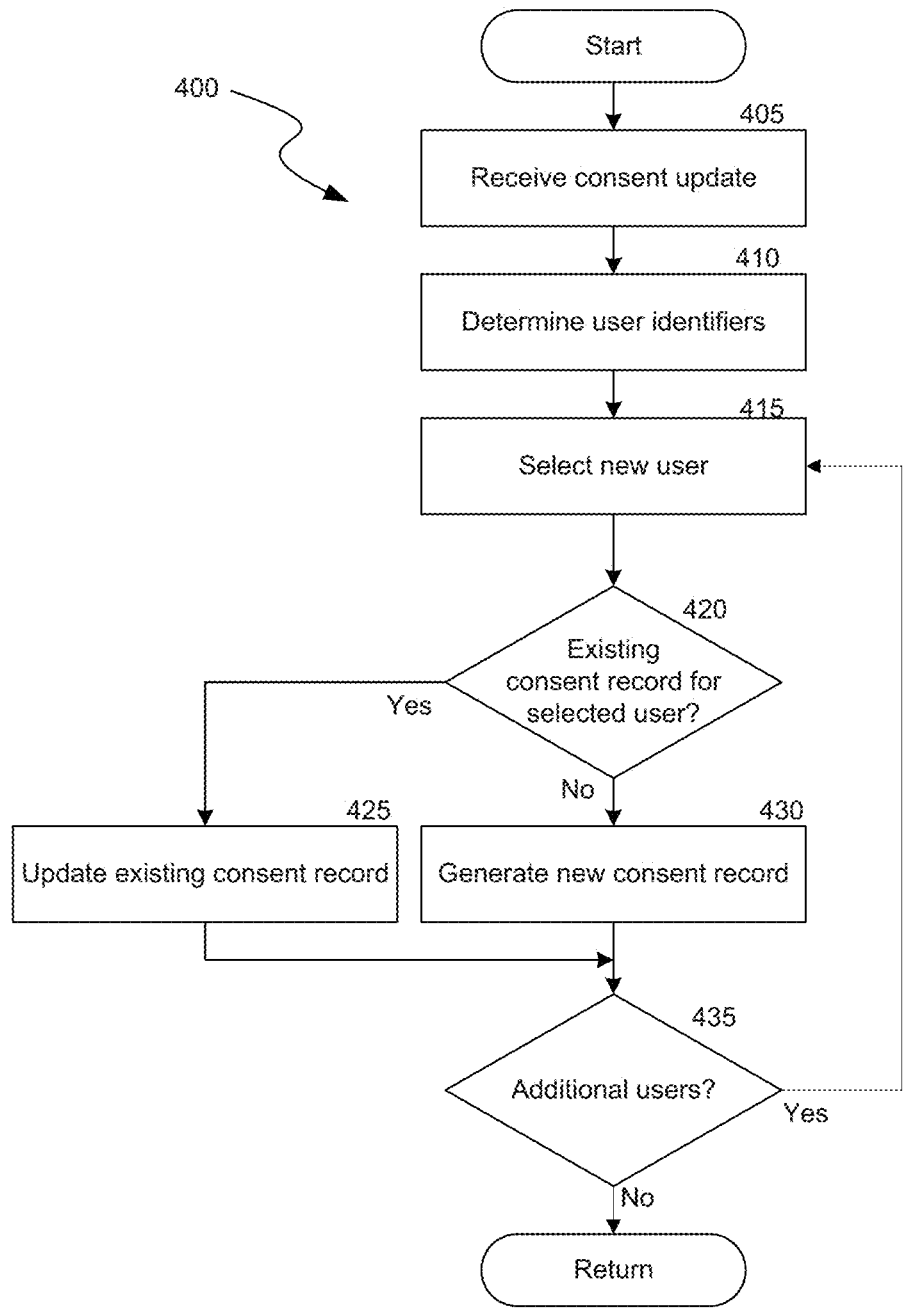
FIG. 4 is a flow diagram illustrating an exemplary process implemented by a user consent service for updating user consent records.
Figure 5:
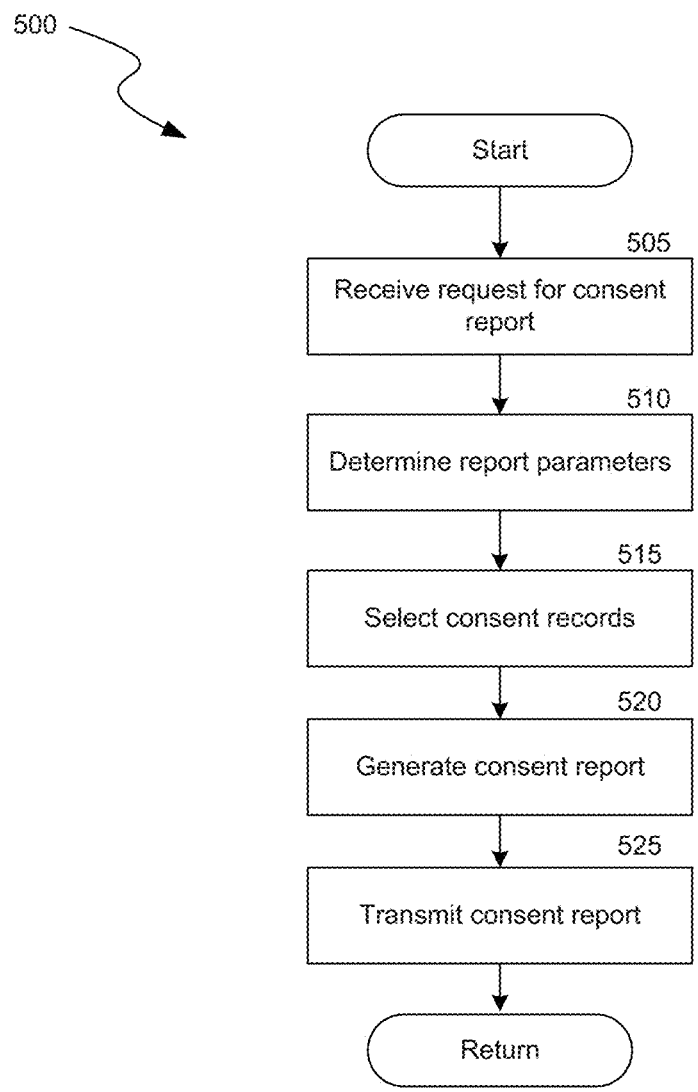
FIG. 5 is a flow diagram illustrating an exemplary process implemented by a user consent service for responding to a query of user consent records.
Figure 6:
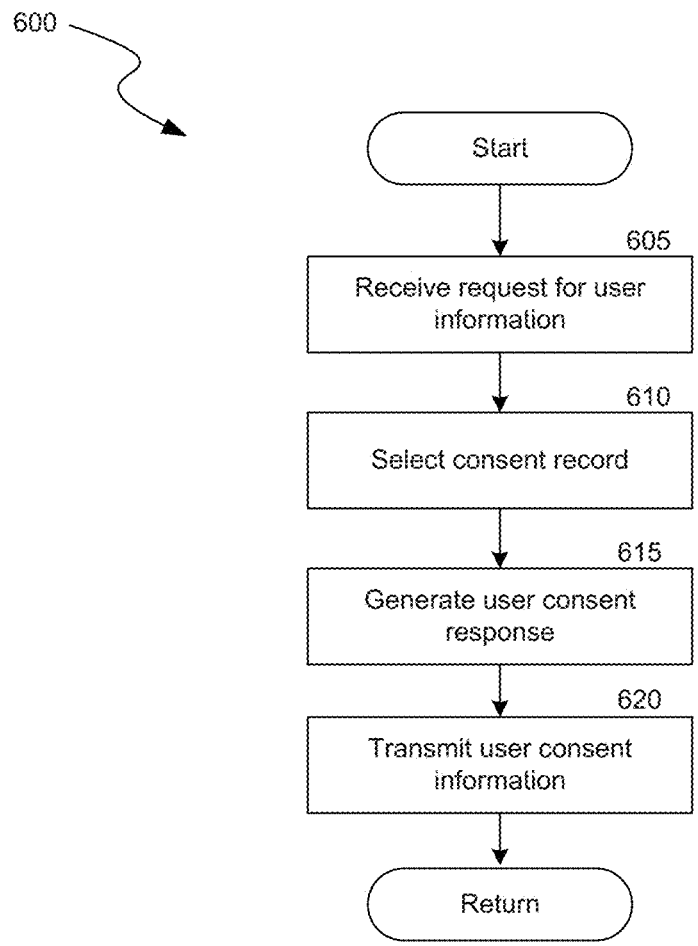
FIG. 6 is a flow diagram illustrating an exemplary process implemented by a user consent service for exporting user consent records.

FIGS. 4-6 are flow diagrams illustrating example processes 400, 500, and 600, respectively, implemented by a user consent service, for cataloguing user consent to sharing their data, and providing the user consent information to mobile network operators or other interested parties.

FIG. 4 illustrates generally a process 400 for generating and updating consent records based on information received from service providers. The process 400 begins at a block 405, where the service receives a consent update associated with one or more users. The consent update may be received, for example, from a service provider, and may include consent information for one or more users or potential users of the service provider. For example, as part of a registration or access attempt, the service provider may prompt users to consent to the sharing of their data with the service provider. The prompt for consent, as well as the user response, may be made through a mobile application associated with the service provider and executed on the user's mobile communication device, through a website associated with the service provider, through SMS messages sent from and received by the service provider, etc. Based on the user exchanges, the service provider generates a consent update to be transmitted to and received by the service. The consent update received by the service may include, for example, one or more user identifiers (such as a telephone number or other identifier) and the type of sharing that the user has consented to (e.g., what forms of user data the user is consenting to being shared with the service provider). In some circumstances, rather than a consent to sharing data, the user may have requested to terminate a previously-approved sharing consent. In that case, the consent update may indicate whether any users have revoked previously-approved sharing consents.

At a block 410, the service determines user identifiers associated with the received consent update. Typically, the service is provided user identifiers as part of the consent update. For example, the consent update includes mobile telephone numbers of users providing consent. In some circumstances, the consent update does not include one or more user mobile telephone numbers, but instead includes enough other characterizing information to allow the service to correlate each user consent with a mobile telephone number of the associated user. For example, the consent update may include an email associated with a user that can be correlated by the service with the appropriate user identifier. If the received consent update is associated with multiple users, the service determines user identifiers for all users. If a user identifier is not received in the consent update, or if a user identifier cannot be determined by the service, the service may transmit an indication to the service provider indicating that the consent update has failed in full or in part.

Blocks 415-435 reflect a process wherein the service uses the received consent update to generate new consent records or update existing consent records. At block 415 the service selects one of the users in the consent update to process. At a decision block 420, the service determines whether a consent record exists for the selected user. For example, the service may evaluate whether there are any existing consent records with a user identifier matching the user identifier of the user. If there is an existing consent record, processing continues to a block 425. If there is no existing consent record, processing continues to a block 430.

If at decision block 420 the service determines that there is an existing consent record for the user, then at block 425 the service updates the user's consent record based on the received consent update. For example, the existing consent record for the user may not have a consent associated with the service provider that transmitted the consent update, so the consent record will need to be updated to capture the consent corresponding to the service provider. As a further example, the existing consent record may already reflect consent associated with the service provider that transmitted the consent update. In that case, the existing consent record needs to be revised based on the received consent update (e.g., to modify the type of data that is to be shared, such that different aspects of user data are permitted to be shared with the service provider). As a still further example, the consent update may indicate that the user has revoked consent previously granted to the service provider. When consent has been revoked by the user, the service may delete the corresponding data for the service provider in the existing consent record or may update a status field in the consent record to reflect that consent has been revoked.

If at decision block 420 the service determines that there is no existing consent record for the user, then at block 430 the service generates a new consent record based on the received consent update.

After generating or updating a consent record, processing continues to decision block 435. At block 435, the service determines whether any additional users need to be processed from the consent update. If they do, processing returns to block 415 where an additional user is selected for processing. If no additional users need to be processed, the process terminates.

FIG. 5 illustrates generally a representative process 500 executed by the service to generate a consent report that spans multiple users. The process begins at a block 505, where the service receives a request for a consent report. The service may receive the request, for example, from a mobile network operator. In some embodiments, not shown, the service periodically initiates the process for generating a report for the mobile network operator, even without a mobile network operator request. For example, the service may automatically generate reports for a mobile network operator on a weekly basis. In some embodiments, not shown, the service periodically initiates the process for generating a report intended for one or more mobile network operators operating in a certain country, even without receiving a request from any of the mobile network operators.

At a block 510, the service determines the parameters of the report to be generated. For example, if the service is generating a consent report in response to a request from a specific mobile network operator, the service may determine that the consent report should only include information for users who are subscribers of the mobile network operator. As a further example, if the service is generating a country-level report (intended for mobile network operators that offer services in the country), the service may determine that the consent report should only include information for users with telephone numbers originating from that country.

At a block 515, the service selects the consent records to be included in the consent report, based on the determined parameters. For example, the service may select the consent records associated with users who subscribe to the mobile network operator requesting the consent report. As a further example, the service may select all of the consent records associated with the country for which a country-level report is being generated (based on, for example, country codes included in the consent records).

At a block 520, the service generates a consent report based on the selected consent records. The consent report may include the entirety of the data found in the selected consent records or a subset of the data found in the selected consent records. For example, the consent report may include user identifiers (such as telephone number) for the selected consent records, as well as consent data associated with the service providers with whom the users have consented to data sharing. In some embodiments, the generated consent report includes only changes since the last consent report for the same network operator was generated. That is, for example, if the service is generating a consent report for mobile network operators operating in the United States, and the last United States-level report was generated 24 hours ago, the newly generated United States-level report may contain only the registration of new consents and revocation of existing consents made in the last 24 hours. In some embodiments, the consent reported is generated differently to reflect the consent collection requirements of the intended recipients of the report. For example, if the report is intended for a mobile network operator that requires user consent to be collected via particular collection methods (e.g., over SMS), the generated report may reflect only the consent records that indicate they were collected using the required method. As a still further example, if the report is intended for a collection of mobile network operators operating in a country that requires consent to be collected explicitly, then the generated report may reflect only the consent records associated with an explicit consent type.

At a block 525, the service transmits the generated report to the intended recipients. For example, the service may transmit an operator-specific report to the mobile network operator that requested the report, or may transmit a country-level report to the mobile network operators that provide services in that country. Based on the received consent report, the recipient (e.g., one or more mobile network operators) may approve or deny requests from service providers for user data, depending on the amount of sharing the users have consented to. The process then terminates.

FIG. 6 illustrates generally a representative process 600 executed by the service to generate a consent report for a single user. The process begins at a block 605, where the service receives a request for consent information associated with a specific user. The request may be received, for example, from a mobile network operator, and may identify the user using a unique user identifier, such as the user's mobile telephone number, MSISDN, username, or other. The request for information may include a request for the entire consent status associated with the user (i.e., which service providers the user has consented to sharing user data with, and what type and amount of data is the user willing to share), for the type and amount of data the user has consented to share with a particular service provider, and for the user's consent history (i.e., which service providers the user has consented to sharing user data with, which service providers the user has revoked sharing with, etc.).

At a block 610, the service selects the consent record associated with the request. The appropriate consent record may be selected, for example, using the user identifier.

At a block 615, the service generates a user consent response from the selected consent record. The content of the generated user consent response may be based on the type of requested user consent information.

At a block 620, the service transmits the user consent response to the requestor. Based on the received consent report, the recipient (e.g., a mobile network operator) may approve or deny requests from service providers for user data, depending on the type and amount of sharing the users have consented to. The process then terminates.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/ or modified to provide alternative combinations or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

These and other changes can be made to the disclosed technology in light of the above Detailed Description. While the above description describes certain examples of the disclosed technology, and describes the best mode contemplated, no matter how detailed the above appears in text, the disclosed technology can be practiced in many ways. Details of the service and method may vary considerably in their specific implementations, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. In general, the terms used in the following claims should not be construed to limit the disclosed technology to the specific examples disclosed in the specification, unless the above Detailed Description section explicitly defines such terms.

We claim:

1. A computer-implemented method of providing a mobile network operator consent statuses from a plurality of service providers, the method comprising:

maintaining, at a computing system, a plurality of consent records, wherein each consent record comprises a user identifier associated with a mobile device of a user, a mobile network operator identifier associated with a mobile network operator with which the user is subscribed, a plurality of service providers, and consent statuses corresponding to each of the service providers, each of the consent statuses governing the sharing of data, associated with the user, by the mobile network operator with the service providers corresponding to the consent status;

receiving, from a service provider, a consent update associated with a user, the consent update comprising a user identifier and a consent status that indicates a willingness of the user to share data with a service provider;

updating a consent record, from the plurality of maintained consent records, based on the received consent update;

receiving, from a requesting mobile network operator, a request for consent statuses, wherein the requesting mobile network operator is associated with a requesting mobile network operator identifier;

identifying, from the plurality of consent records, consent records comprising mobile network operator identifiers matching the requesting mobile network operator identifier;

generating a consent report based on the identified set of consent records, the consent report including consent statuses of a plurality of users; and transmitting the consent report to the requesting mobile network operator.

2. The computer-implemented method of claim 1, wherein the user identifier is a telephone number associated with a user.

3. The computer-implemented method of claim 1, wherein each consent record further comprises a country code, associated with the user, and wherein the identification of the set of consent records is based on the country code and a country associated with the requesting mobile network operator.

4. The computer-implemented method of claim 1, wherein each consent record further comprises a consent method.

5. The computer-implemented method of claim 4, wherein the consent method is one of a SMS message-based consent, an application-based consent, or a website-based consent.

6. The computer-implemented method of claim 4, wherein the requesting mobile network operator is associated with a required consent collection method, and wherein generating the consent report comprises omitting consent records associated with a consent method other than the required consent collection method of the requesting mobile network operator.

7. The computer-implemented method of claim 1, wherein each consent record further comprises a type of information that the user has consented to share with one of the plurality of service providers.

8. The computer-implemented method of claim 1, wherein the generated consent report is based on changes to the maintained consent records since a prior consent report was generated.

9. The computer-implemented method of claim 1, wherein the transmission causes the requesting mobile network operator to approve or deny a request for user data from a service provider based on consent statuses in the consent report.

10. The computer-implemented method of claim 9, wherein:

each consent record further comprises a type of information that a user has consented to share; and the service provider request for user data is associated with a requested type of information; and whether the requesting mobile network operator approves or denies the request is further based on whether the user has consented to share the requested type of information.

11. The computer-implemented method of claim 1, further comprising:

receiving, from the service provider, a revocation of consent from a user to share user data with the service provider; and updating the consent record associated with the user to reflect that the consent status has been revoked.

12. A computer-implemented method of providing a mobile network operator a consent status associated with a user, the method comprising:

maintaining, at a computing system, a plurality of consent records, wherein each consent record comprises a user identifier associated with a mobile device of a user, a mobile network operator identifier associated with a mobile network operator with which the user is subscribed, and consent statuses between the user and each of a plurality of service providers, each of the consent statuses governing the sharing of data, associated with the user, by the mobile network operator with the service providers corresponding to the consent status;

receiving, from a service provider, a consent update associated with a user, the consent update comprising a user identifier and a consent status that indicates a willingness of the user to share data with a service provider;

updating a consent record, from the plurality of maintained consent records, based on the received consent update;

receiving a request for a consent status of a user from a requesting mobile network operator associated with a requesting mobile network operator identifier;

identifying, from the plurality of consent records, a consent record associated with the user and comprising the mobile network operator identifier matching the requesting mobile network operator identifier;

identifying, from the consent record, the consent status of the user for each of a plurality of service providers; and transmitting the consent status of the user for each of a plurality of service providers to the requesting mobile network operator.

13. The computer-implemented method of claim 12, wherein the user identifier is a MSISDN.

14. The computer-implemented method of claim 12, wherein the consent update further comprises a manner in which the user indicated the willingness to share data with the service provider.

15. The computer-implemented method of claim 14, wherein the manner comprises via an SMS message, via an application, or via a website.

16. The computer-implemented method of claim 14, wherein the transmitted consent status further includes a manner in which the user indicated the willingness to share data with each of the plurality of service providers.

17. The computer-implemented method of claim 12, wherein the consent update further comprises a consent type, wherein the consent type comprises explicit consent or implicit consent.

18. The computer-implemented method of claim 12, wherein the transmission causes the requesting mobile network operator to approve or deny a request from a service provider for user data based on the transmitted consent statuses.

19. The computer-implemented method of claim 18, wherein:

each consent record further comprises a type of information that the user has consented to share;

the service provider request for user data is associated with a requested type of information; and whether the requesting mobile network operator approves or denies the request is further based on whether the user has consented to share the requested type of information.

20. The computer-implemented method of claim 12, further comprising updating a consent record based on an indication of revoked consent.

* * * * *